(12) United States Patent
Yonezawa et al.

(10) Patent No.: US 9,874,140 B2
(45) Date of Patent: Jan. 23, 2018

(54) TURBOCHARGER

(71) Applicants: TOYOTA JIDOSHA KABUSHIKI KAISHA, Toyota-shi (JP); OTICS CORPORATION, Nishio (JP)

(72) Inventors: Koichi Yonezawa, Toyota (JP); Ryu Osuka, Nukata-gun (JP)

(73) Assignees: TOYOTA JIDOSHA KABUSHIKI KAISHA, Toyota-shi (JP); OTICS CORPORATION, Nishio (JP)

( * ) Notice: Subject to any disclaimer, the term of this patent is extended or adjusted under 35 U.S.C. 154(b) by 86 days.

(21) Appl. No.: 14/793,075

(22) Filed: Jul. 7, 2015

(65) Prior Publication Data

US 2016/0003259 A1  Jan. 7, 2016

(30) Foreign Application Priority Data

Jul. 7, 2014  (JP) .................................. 2014-139301

(51) Int. Cl.
*F04D 29/42* (2006.01)
*F02B 39/00* (2006.01)
(Continued)

(52) U.S. Cl.
CPC ................ *F02B 39/00* (2013.01); *F02C 6/12* (2013.01); *F04D 29/4206* (2013.01); *F04D 29/441* (2013.01); *F05D 2220/40* (2013.01)

(58) Field of Classification Search
CPC ............. F05D 2240/14; F05D 2240/70; F05D 2240/128; F01D 9/026
(Continued)

(56) References Cited

U.S. PATENT DOCUMENTS 5,246,352 A    9/1993  Kawakami
6,193,463 B1 *  2/2001  Adeff .................... F04D 29/023
                                                         415/196
(Continued)

FOREIGN PATENT DOCUMENTS

EP   2 711 555 A2    3/2014
JP   03-110140 U    11/1991
(Continued)

OTHER PUBLICATIONS

Machine Translation of JP 2014062492, Translated on Nov. 22, 2016.*
(Continued)

*Primary Examiner* — Patrick Maines
(74) *Attorney, Agent, or Firm* — Oblon, McClelland, Maier & Neustadt, L.L.P.

(57) ABSTRACT

A turbocharger includes a compressor housing including a scroll chamber, and a seal plate assembled to the compressor housing. The compressor housing and the seal plate define an intake passage. The seal plate includes a plate-side connecting portion in contact with the compressor housing. The radius of curvature of a wall surface of the scroll chamber of the compressor housing, in a section including a compressor rotational axis, is increased in a direction toward an outlet located on the downstream side of the scroll chamber in an intake air flow direction. The plate-side connecting portion protrudes in a direction along the compressor rotational axis. The radius of curvature of an inner surface of the seal plate continuous with the scroll chamber of the intake passage, in the section including the compressor rotational axis, is increased in the direction toward the outlet of the scroll chamber.

6 Claims, 5 Drawing Sheets

(51) Int. Cl.
*F02C 6/12* (2006.01)
*F04D 29/44* (2006.01)

(58) Field of Classification Search
USPC .............. 60/605.1, 598; 415/204, 212.1, 73
See application file for complete search history.

(56) References Cited

U.S. PATENT DOCUMENTS

| | | | |
|---|---|---|---|
| 6,449,950 B1 * | 9/2002 | Allen | F01D 25/166 417/407 |
| 6,845,617 B1 * | 1/2005 | Allen | F01D 15/10 123/565 |
| 2009/0025386 A1 * | 1/2009 | Rumsby | F02B 37/10 60/607 |
| 2010/0247342 A1 * | 9/2010 | Shimizu | F01D 15/10 417/410.1 |
| 2013/0039750 A1 * | 2/2013 | Osuka | B22C 9/24 415/204 |
| 2014/0086726 A1 * | 3/2014 | Isogai | F01D 9/026 415/73 |

FOREIGN PATENT DOCUMENTS

| | | | |
|---|---|---|---|
| JP | 4-6735 U | | 1/1992 |
| JP | 04-125634 U | | 11/1992 |
| JP | 2009-243299 | | 10/2009 |
| JP | 2009243299 A | * | 10/2009 |
| JP | 4697492 | | 6/2011 |
| JP | 2013-76365 A | | 4/2013 |
| JP | 2014-62492 A | | 4/2014 |
| JP | 2014062492 A | * | 4/2014 |

OTHER PUBLICATIONS

Partial English language translation of Notification of Reason(s) for Refusal dated May 10, 2016 in Japanese Patent Application No. 2014-139301.

* cited by examiner

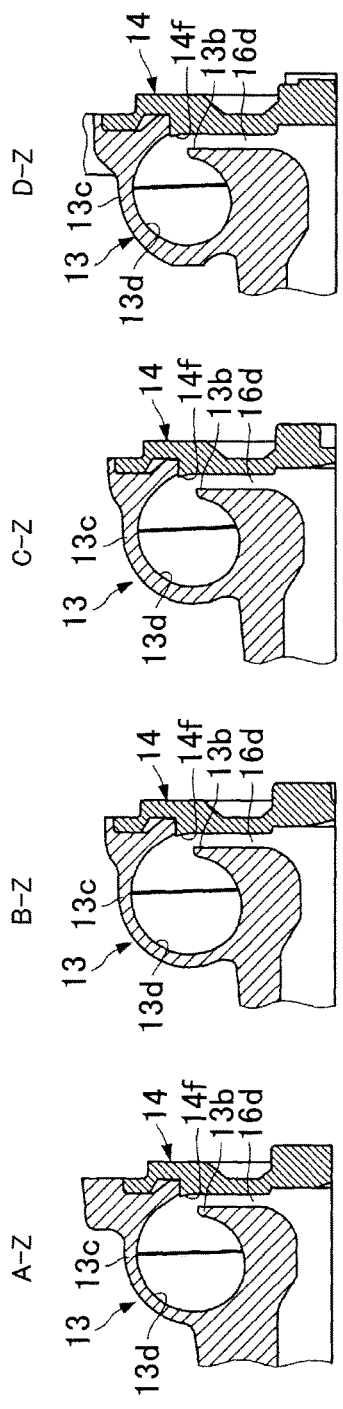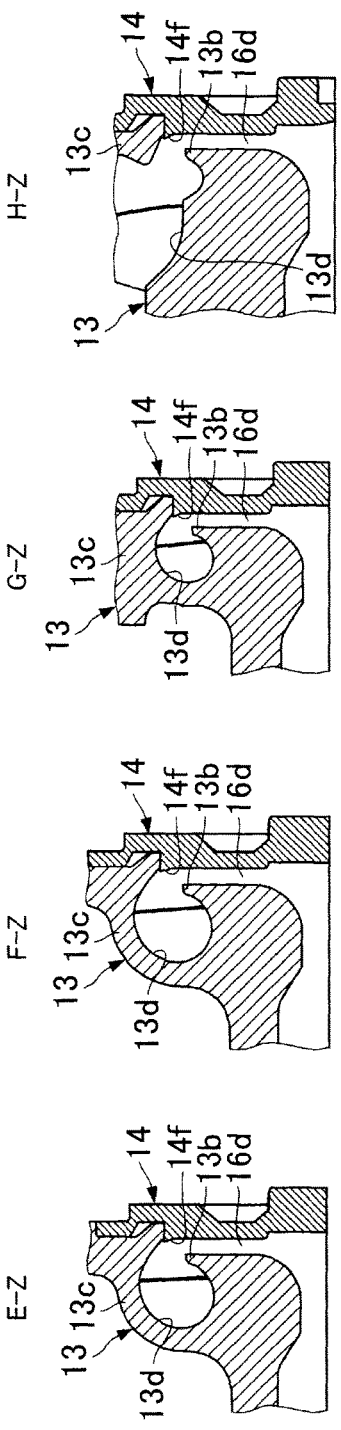

TURBOCHARGER

INCORPORATION BY REFERENCE

The disclosure of Japanese Patent Application No. 2014-139301 filed on Jul. 7, 2014 including the specification, drawings and abstract is incorporated herein by reference in its entirety.

BACKGROUND OF THE INVENTION

1. Field of the Invention

The invention relates to a turbocharger having an intake passage formed by assembling a seal plate to a compressor housing.

2. Description of Related Art

Some conventional vehicles driven by an internal combustion engine are equipped with a turbocharger that increases the output of the internal combustion engine. The turbocharger is configured to obtain energy from exhaust gas discharged from the internal combustion engine and forces extra air into the internal combustion engine using the energy obtained from the exhaust gas.

As a turbocharger having an intake passage formed by assembling a seal plate to a compressor housing, a turbocharger in which a scroll chamber of a compressor housing and a seal plate are smoothly continuous with each other in an intake passage is described in, for example, Japanese Patent No. 4697492.

SUMMARY OF THE INVENTION

In some conventional turbochargers as described above, the radius of curvature of the wall surface of a scroll chamber of a compressor housing increases in a direction toward an outlet in the circumferential direction of the compressor housing. In the thus configured turbocharger, a flow passage resistance may unfortunately be generated when there is a difference in level in a direction (counter direction) perpendicular to the extending direction of an intake passage, between the surface of the compressor housing and the surface of a seal plate, which are adjacent to each other, and the flow of intake air is hindered due to the level difference.

The invention provides a turbocharger configured to curb an increase in the flow passage resistance.

A turbocharger according to an aspect of the invention includes a compressor housing including a scroll chamber, and a seal plate assembled to the compressor housing. The compressor housing and the seal plate define an intake passage. The seal plate includes a plate-side connecting portion in contact with the compressor housing. The radius of curvature of a wall surface of the scroll chamber of the compressor housing, in a section including a compressor rotational axis, is increased in a direction toward an outlet located on the downstream side of the scroll chamber in an intake air flow direction. The plate-side connecting portion protrudes in a direction along the compressor rotational axis. The radius of curvature of an inner surface of the seal plate continuous with the scroll chamber of the intake passage, in the section including the compressor rotational axis, is increased in the direction toward the outlet of the scroll chamber.

In this configuration, there is not a difference in level in a direction (counter direction) perpendicular to the extending direction of the intake passage, the level difference hindering the flow of intake air, between the surface of the compressor housing and the surface of the seal plate, which are adjacent to each other. Thus, according to the above aspect of the invention, it is possible to curb an increase in the flow passage resistance, for example, even in a turbocharger having a scroll chamber that is not symmetric with respect to the compressor rotational axis.

According to the invention, it is possible to provide the turbocharger configured to curb an increase in the flow passage resistance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A is an enlarged sectional view of the turbocharger according to the embodiment of the invention, taken along the line A-Z in FIG. 3;

FIG. 4B is an enlarged sectional view of the turbocharger according to the embodiment of the invention, taken along the line B-Z in FIG. 3;

FIG. 4C is an enlarged sectional view of the turbocharger according to the embodiment of the invention, taken along the line C-Z in FIG. 3;

FIG. 4D is an enlarged sectional view of the turbocharger according to the embodiment of the invention, taken along the line D-Z in FIG. 3;

FIG. 4E is an enlarged sectional view of the turbocharger according to the embodiment of the invention, taken along the line E-Z in FIG. 3;

FIG. 4F is an enlarged sectional view of the turbocharger according to the embodiment of the invention, taken along the line F-Z in FIG. 3;

FIG. 4G is an enlarged sectional view of the turbocharger according to the embodiment of the invention, taken along the line G-Z in FIG. 3;

FIG. 4H is an enlarged sectional view of the turbocharger according to the embodiment of the invention, taken along the line H-Z in FIG. 3;

DETAILED DESCRIPTION OF EMBODIMENTS

Hereinafter, example embodiments of the invention will be described with reference to the accompanying drawings.

Figure 1:
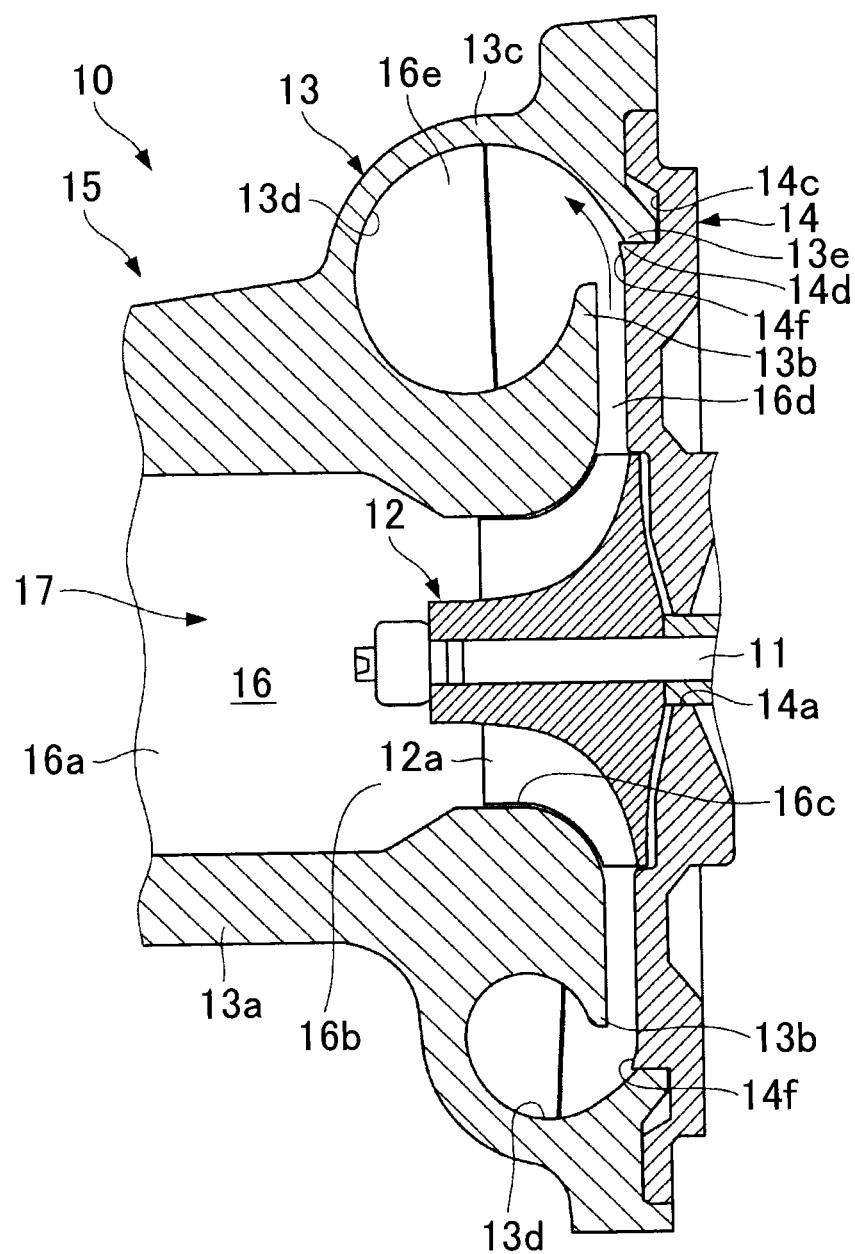
FIG. 1 is an enlarged sectional view of a compressor, including the rotational axis of the compressor, in a turbocharger according to an embodiment of the invention.

As illustrated in FIG. 1, a turbocharger 10 according to an embodiment of the invention is, for example, a variable geometry turbocharger. The turbocharger 10 constitutes part of a diesel engine that is mounted as an internal combustion engine in a vehicle. Note that, FIG. 1 illustrates only part of the turbocharger 10. The turbocharger 10 according to the present embodiment may be applied not only to diesel engines but also to internal combustion engines that run on liquid fuel such as gasoline or ethanol.

The turbocharger 10 according to the present embodiment includes a rotary shaft 11, a compressor wheel 12, a compressor housing 13, and a seal plate 14. The rotary shaft 11 is rotatably held by a bearing (not illustrated) and a bearing housing (not illustrated), and a turbine wheel (not illustrated) is coupled to one end of the rotary shaft 11. The compressor wheel 12 is coupled to the other end of the rotary shaft 11. The compressor wheel 12 and the compressor housing 13 constitute a compressor 17 having an intake passage 16.

The turbine wheel is coupled to the one end of the rotary shaft 11, and the compressor wheel 12 is coupled to the other end of the rotary shaft 11. Thus, the rotary shaft 11 transmits driving force generated by the turbine wheel, which is rotated by exhaust gas discharged from an exhaust device (not illustrated), to the compressor wheel 12.

Thus, the rotational speed of the compressor wheel 12 varies depending on variations in the rotational speed of the turbine wheel. Hence, the boost pressure of intake air compressed by the compressor 17 varies. The compressor 17 compresses the intake air, which is taken in on the upstream side, through rotation of the compressor wheel 12, and then supplies the compressed intake air to an engine intake passage (not illustrated) located on the downstream side.

Multiple blades 12a in the form of vanes are disposed at regular intervals on the outer periphery of the rotary shaft 11. The compressor wheel 12 has passages through which the intake air passes. The passages are defined between the blades 12a disposed adjacent to each other. The cross-sectional passage area of each passage is set to decrease from the upstream side toward the downstream side in a direction in which the intake air flows (hereinafter, referred to as "intake air flow direction").

The compressor wheel 12 configured as described above rotates together with the rotary shaft 11, thereby imparting centrifugal force to the intake air, which is supplied from the upstream side toward the downstream side in the intake air flow direction. As a result, the flow speed of the intake air is accelerated in the radial direction.

Figure 2:
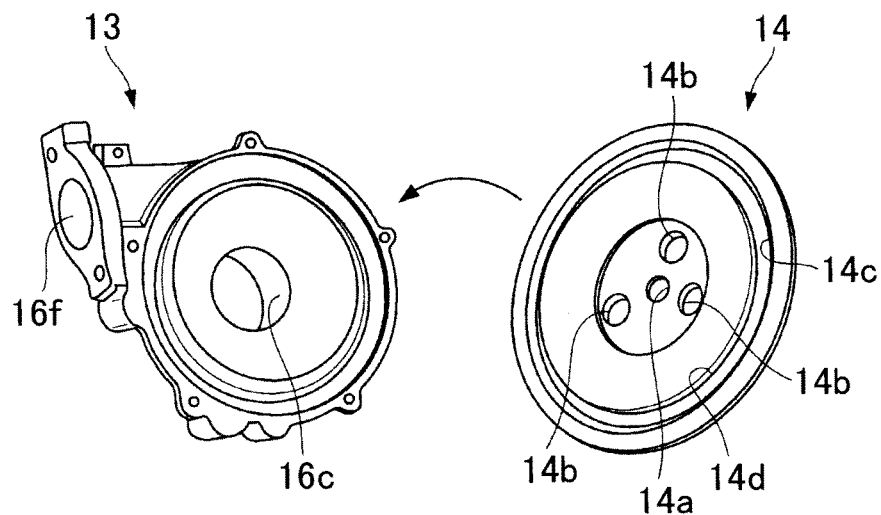
FIG. 2 is an exploded perspective view illustrating a compressor housing and a seal plate of the turbocharger according to the embodiment of the invention.
Figure 3:
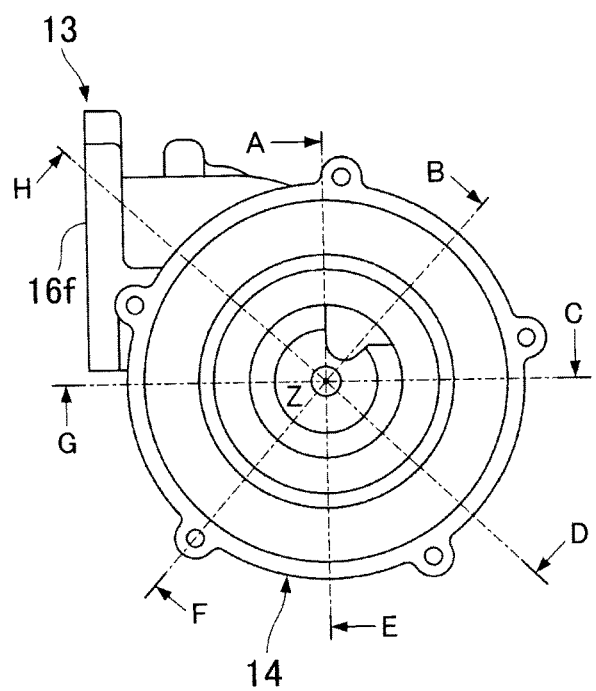
FIG. 3 is a side view of the compressor of the turbocharger according to the embodiment of the invention.

The compressor housing 13 is made by aluminum alloy die casting or gravity casting. One end portion (on the left side in FIG. 1) of the compressor housing 13 is coupled to an intake pipe (not illustrated) located on the upstream side, and the other end portion (on the right side in FIG. 1) of the compressor housing 13 is coupled to the seal plate 14 as illustrated in FIG. 2 and FIG. 3. Thus, the compressor housing 13 is coupled to the bearing housing via the seal plate 14.

The compressor housing 13 has a tubular portion 13a extending in the axial direction of the rotary shaft 11. The compressor wheel 12 is housed in the tubular portion 13a.

The turbine-side end portion of the tubular portion 13a in the axial direction is provided with an annular flange 13b that protrudes in a direction perpendicular to the axial direction of the rotary shaft 11. The compressor housing 13 further has an annular outer wall portion 13c that surrounds the flange 13b.

The intake passage 16 includes an introduction passage 16a, a flow regulation passage 16b, a wheel chamber 16c, a diffuser passage 16d, and a scroll chamber 16e arranged in this order in the intake air flow direction.

The introduction passage 16a is defined by the tubular portion 13a and communicates with the intake passage on the upstream side (not illustrated). Through the introduction passage 16a, the intake air is introduced toward the compressor wheel 12.

The wheel chamber 16c is defined by the tubular portion 13a and communicates with the introduction passage 16a. The compressor wheel 12 is housed in the wheel chamber 16c.

The diffuser passage 16d is a space between the compressor housing 13 and the seal plate 14. Specifically, the diffuser passage 16d is defined by the flange 13b and the seal plate 14 that faces the flange 13b. The diffuser passage 16d communicates at its upstream end in the intake air flow direction with the wheel chamber 16c, and communicates at its downstream end in the intake air flow direction with the scroll chamber 16e.

Thus, the diffuser passage 16d allows the intake air, which has been pressurized and accelerated by the compressor wheel 12, to flow into the scroll chamber 16e. The cross-sectional passage area of the diffuser passage 16d is set smaller than the cross-sectional passage area of each of the introduction passage 16a and the scroll chamber 16e.

The diffuser passage 16d is an annular passage extending radially from the wheel chamber 16c. Thus, the cross-sectional passage area of the annular diffuser passage 16d increases gradually from the upstream side to the downstream side in the intake air flow direction.

With this configuration, the flow velocity of the intake air that is supplied from the wheel chamber 16c to the scroll chamber 16e is gradually decreased while the intake air flows through the diffuser passage 16d. That is, the diffuser passage 16d is configured such that the intake air that has been accelerated in the radial direction by the compressor wheel 12 is decelerated.

The scroll chamber 16e surrounds the radially outer side of the wheel chamber 16c in a spiral manner. The scroll chamber 16e communicates at its upstream end in the intake air flow direction with the diffuser passage 16d, and the downstream end of the scroll chamber 16e in the intake air flow direction serves as an outlet 16f. The radius of curvature of a wall surface 13d of the scroll chamber 16e increases in a direction toward the outlet 16f of the scroll chamber 16e as illustrated in FIG. 4A to FIG. 4H that are sectional views respectively taken along the lines A-Z, B-Z, C-Z, D-Z, E-Z, F-Z, G-Z, and H-Z in FIG. 3. Note that, FIG. 4H, FIG. 4G, FIG. 4F, FIG. 4E, FIG. 4D, FIG. 4C, FIG. 4B and FIG. 4A are cross-sectional views of the scroll chamber 16e, which are arranged in this order in the direction toward the outlet 16f. In other words, a portion of the scroll chamber 16e illustrated in FIG. 4A is closest to the outlet 16f, and a portion of the scroll chamber 16e illustrated in FIG. 4H is farthest from the outlet 16f, from among the portions of scroll chamber 16e illustrated in FIG. 4A to FIG. 4H. That is, the cross-sectional passage area of the scroll chamber 16e increases toward the outlet 16f of the scroll chamber 16e. Thus, through the scroll chamber 16e, the intake air that has passed through the wheel chamber 16c and the diffuser passage 16d is supplied, by supercharging, into an intake device (not illustrated) located on the downstream side in the intake air flow direction.

As illustrated in FIG. 2, the seal plate 14 has a generally disc shape, and has a through-hole 14a at its center. The rotary shaft 11 extends through the through-hole 14a. The seal plate 14 further has screw holes 14b into which bolts or the like (not illustrated) are inserted to secure the seal plate 14 to the bearing housing. The seal plate 14 has an engagement groove 14c with which the terminal end of the outer wall portion 13c is engaged.

Thus, the outer wall portion 13c of the compressor housing 13 is formed in an annular sectional shape such that the wall surface 13d of the scroll chamber 16e extends in a curve from the distal end of the flange 13b back to a position near the distal end of the flange 13b. Therefore, the downstream end of the diffuser passage 16d, that is, the upstream end of the scroll chamber 16e, is defined by the positions of both ends of the wall surface 13d in a curved surface shape.

A housing-side connecting portion 13e of the compressor housing 13 and a plate-side connecting portion 14d of the seal plate 14 are located at a junction between the compressor housing 13 and the seal plate 14.

Figure 5A:
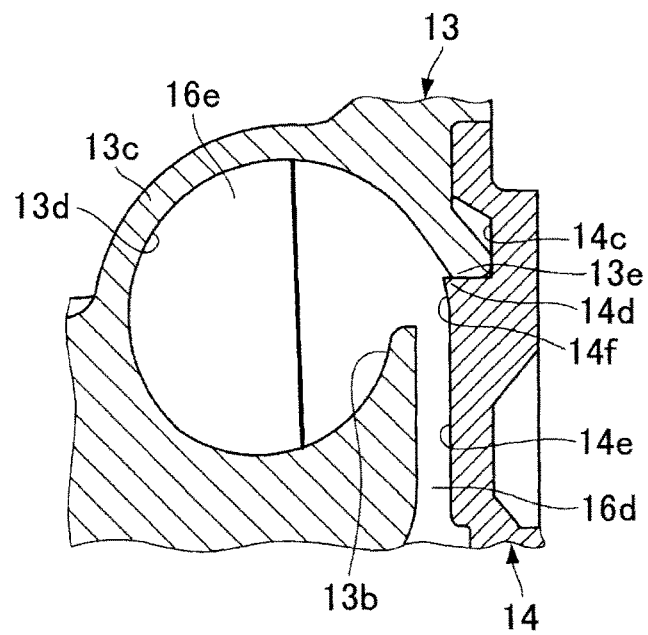
FIG. 5A is an enlarged sectional view illustrating an example of a junction between the compressor housing and the seal plate of the turbocharger according to the embodiment of the invention, taken along the line A-Z in FIG. 3.
Figure 5B:
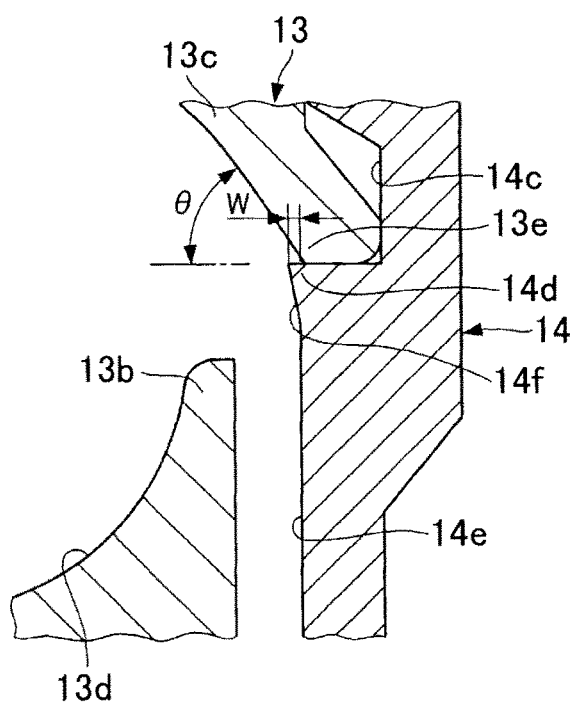
FIG. 5B is an enlarged sectional view of a main portion, illustrating an example of the junction between the compressor housing and the seal plate of the turbocharger according to the embodiment of the invention.

Specifically, as illustrated in FIG. 5A and FIG. 5B, the terminal end of the outer wall portion 13c of the compressor housing 13 constitutes the housing-side connecting portion 13e that is the upstream end of the scroll chamber 16e. The inner end of the engagement groove 14c of the seal plate 14 constitutes the plate-side connecting portion 14d that is the downstream end of the diffuser passage 16d.

The plate-side connecting portion 14d protrudes into the scroll chamber 16e (intake passage 16) beyond the housing-side connecting portion 13e of the compressor housing 13. An inner surface 14e of the seal plate 14 continuous with the scroll chamber 16e of the intake passage 16 includes an inner surface 14f of the plate-side connecting portion 14d. The radius of curvature of the inner surface 14f increases in the direction toward the outlet 16f of the scroll chamber 16e. The housing-side connecting portion 13e is recessed, at its portion on the plate-side connecting portion 14d side, with respect to the distal end of the plate-side connecting portion 14d through, for example, chamfering by 0.0 to 1.8 mm including manufacturing variations. Thus, the housing-side connecting portion 13e in contact with the plate-side connecting portion 14d is recessed, so that the plate-side connecting portion 14d protrudes into the scroll chamber 16e beyond the housing-side connecting portion 13e.

That is, the plate-side connecting portion 14d of the seal plate 14 connected to the compressor housing 13 protrudes in a direction along the rotary shaft 11. Further, the radius of curvature of the inner surface 14f of the plate-side connecting portion 14d of the seal plate 14 continuous with the scroll chamber 16e of the intake passage 16, in a section including the rotational axis of the compressor 17, is increased in the direction toward the outlet 16f of the scroll chamber 16e.

The curved surface shape of the compressor housing 13 is not symmetric with respect to the rotational axis of the compressor 17. An angle θ of the surface of the housing-side connecting portion 13e with respect to an axis (horizontal axis) along the rotary shaft 11, illustrated in FIG. 5B, increases in the direction toward the outlet 16f. Thus, in the scroll chamber 16e, the shape of the seal plate 14 side is not symmetric with respect to the rotational axis of the compressor 17, and, preferably, substantially conforms to the curved surface shape of the compressor housing 13 side in terms of flow passage efficiency.

Thus, in the present embodiment, the radius of curvature of the wall surface 13d of the scroll chamber 16e increases in the direction toward the outlet 16f, and the radius of curvature (chamfering angle) of the inner surface 14f of the plate-side connecting portion 14d also increases in the direction toward the outlet 16f.

In this way, a part of the curved surface shape of the scroll chamber 16e formed in the compressor housing 13 is complemented by the plate-side connecting portion 14d of the seal plate 14, so that the curved surface shape of the scroll chamber 16e is maintained.

Figure 6A:
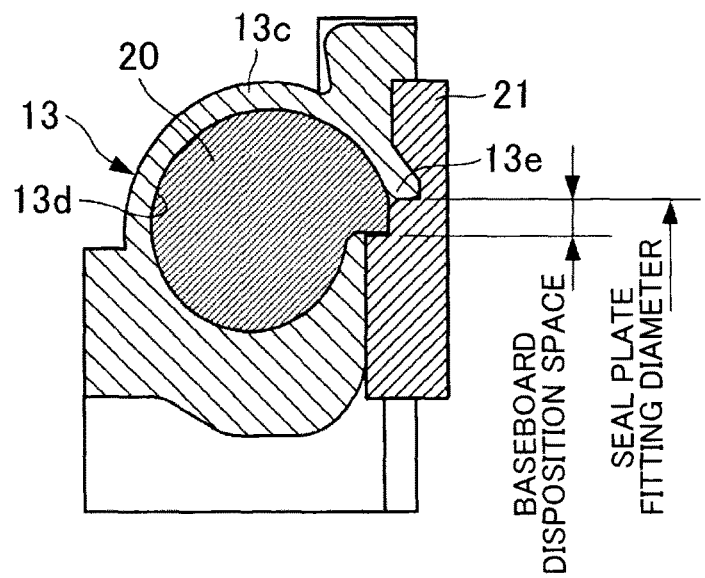
FIG. 6A is a sectional view at a position corresponding to the line A-Z in FIG. 3 in the turbocharger according to the embodiment of the invention, illustrating the relationship between a scroll core and a mold during formation of a scroll chamber.

In the course of molding the compressor housing 13, it is necessary to secure a sufficient positional accuracy of a scroll core 20 used to form the scroll chamber 16e, as illustrated in FIG. 6A. Thus, the scroll core 20 is positioned relative to a mold 21 so as to stick out toward the diffuser side (to the right side in FIG. 6A).

In this case, if the fitting diameter of the seal plate 14 is increased in order to secure a space for disposition of a core print for installing the scroll core 20, the curved surface shape of the scroll chamber 16e is actually reduced by an amount of corresponding to the increase in the fitting diameter.

Even if the positional accuracy of the scroll core 20 used to form the scroll chamber 16e is enhanced, variations such as molding errors actually occur during manufacturing of the compressor housing 13.

Figure 6B:
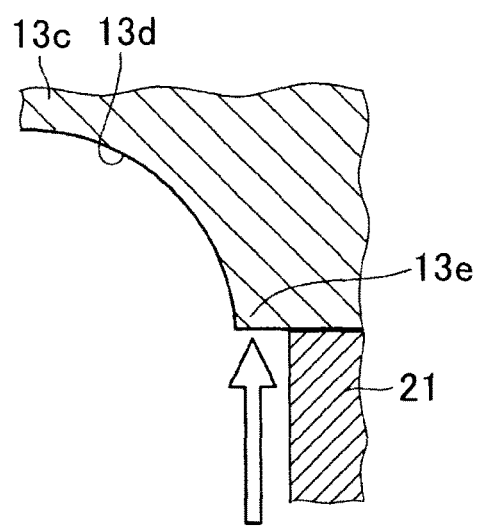
FIG. 6B is an enlarged sectional view of a main portion in the turbocharger according to the embodiment of the invention, illustrating the relationship between the scroll core and the mold during formation of the scroll chamber.

As a result, a difference in level in a direction (counter direction) perpendicular to the extending direction of the intake passage, is caused between the compressor housing 13 and the seal plate 14, as illustrated in FIG. 6B. This decreases the flow passage efficiency.

In view of this, according to the present embodiment of the invention, the curved surface shape of the scroll chamber 16e is complemented by the seal plate 14, and a portion of the compressor housing 13, which is fitted to the seal plate 14, is provided with a chamfer that is not symmetric with respect to the rotational axis of the compressor 17. This makes it possible to curb an increase in the flow passage resistance due to variations caused during manufacturing.

The chamfer is formed by increasing the radius of curvature of the inner wall surface of the housing-side connecting portion 13e in the direction toward the outlet 16f.

With the above-described configuration, the rotational speed of the compressor wheel 12 varies depending on variations in the rotational speed of the turbine wheel that rotates using the energy of the exhaust gas, and the boost pressure of intake air compressed by the compressor 17 varies and then discharged from the outlet 16f.

The compressor 17 compresses the intake air, which is taken in on the upstream side, through rotation of the compressor wheel 12, and then supplies the compressed intake air to the engine intake passage (not illustrated) located on the downstream side.

In this process, the intake air passes through the introduction passage 16a, the flow regulation passage 16b, the wheel chamber 16c, the diffuser passage 16d, and the scroll chamber 16e in this order in the intake passage 16.

The plate-side connecting portion 14d makes it possible to efficiently introduce the air in the passage extending from the diffuser passage 16d to the scroll chamber 16e, into the scroll chamber 16e while curbing an increase in the flow passage resistance.

As described above, in the turbocharger 10 according to the present embodiment of the invention, the intake passage 16 is formed by assembling the seal plate 14 to the compressor housing 13, and the radius of curvature of the wall surface 13d of the scroll chamber 16e of the compressor housing 13, in a section including the rotational axis of the compressor 17, is increased in the direction toward the outlet 16f located on the downstream side of the scroll chamber 16e in the intake air flow direction. Further, in the turbocharger 10 according to the present embodiment, the plate-side connecting portion 14d of the seal plate 14 connected to the compressor housing 13 protrudes beyond the housing-side connecting portion 13e of the compressor housing 13 in a direction along the rotary shaft 11, and the radius of curvature of the inner surface of the seal plate 14 continuous with the scroll chamber 16e of the intake passage 16, in a section including the rotational axis of the compressor 17, is increased in the direction toward the outlet 16f of the scroll chamber 16e. With this configuration of the turbocharger 10, it is possible to curb an increase in the flow passage resistance.

In the turbocharger 10 according to the present embodiment, the compressor housing 13 may be a three-piece compressor housing or a two-piece compressor housing. The seal plate 14 may be integral with the bearing housing.

As described above, the turbocharger according to the invention produces an advantageous effect of curbing an increase in the flow passage resistance, because there is not a difference in level in a direction (counter direction) perpendicular to the extending direction of the intake passage, the level difference hindering the flow of intake air, between the surface of the compressor housing and the surface of the seal plate, which are adjacent to each other. In view of this, the invention may be applied to a wide variety of turbocharges having an intake passage formed by assembling a seal plate to a compressor housing.

What is claimed is:

1. A turbocharger comprising:
   a compressor housing including a scroll chamber; and
   a seal plate assembled to the compressor housing,
   the compressor housing and the seal plate defining an intake passage, the intake passage including a diffuser passage that directly communicates with the scroll chamber,
   the seal plate including an engagement groove with which a terminal end of an outer wall portion of the compressor housing is engaged, the engagement groove being radially inward from an outer edge portion of the seal plate and recessed relative to the diffuser passage and relative to the outer edge portion,
   the seal plate including a plate-side connecting portion in contact with the compressor housing,
   a radius of curvature of a wall surface of the scroll chamber of the compressor housing, in a section including a compressor rotational axis, being increased in a direction toward an outlet located on a downstream side of the scroll chamber in an intake air flow direction,
   the plate-side connecting portion protruding in a direction along the compressor rotational axis, and
   a radius of curvature of an inner surface of the seal plate continuous with the scroll chamber of the intake passage, in the section including the compressor rotational axis, being increased in the direction toward the outlet of the scroll chamber.

2. The turbo charger according to claim 1, wherein the plate-side connection portion extends from an inner end of the engagement groove.

3. The turbo charger according to claim 1, wherein the terminal end of the outer wall portion of the compressor housing has a chamfer that is not symmetric with respect to the compressor rotational axis.

4. The turbo charger according to claim 1, wherein the scroll chamber is defined in part by the terminal end of the outer wall portion of the compressor housing.

5. The turbo charger according to claim 1, wherein an outer radial surface of the engagement groove which connects to the outer edge portion is chamfered.

6. The turbo charger according to claim 1, wherein the terminal end of the outer wall portion of the compressor housing is chamfered to match the outer radial surface of the engagement groove.

* * * * *